United States Patent [19]

Fuld et al.

[11] 4,377,800

[45] Mar. 22, 1983

[54] DATUM SENSOR FOR MEASURING ELONGATIONS

[76] Inventors: Stephan Fuld, Berghofergasse 35/10, A-1120 Vienna; Hans Peterschinegg, Schindlergasse 31, A-1180 Vienna, both of Austria

[21] Appl. No.: 226,982

[22] Filed: Jan. 21, 1981

[30] Foreign Application Priority Data

Feb. 27, 1980 [AT] Austria ................................ 1092/80

[51] Int. Cl.³ .............................................. H01L 1/22
[52] U.S. Cl. ........................................ 338/2; 52/1
[58] Field of Search ................. 338/2, 6; 73/768, 803; 52/1

[56] References Cited

U.S. PATENT DOCUMENTS 2,599,578  6/1952  Obert et al. ..................... 73/768 X
2,924,094  2/1960  Hast ..................................... 73/768
3,323,368  6/1967  Searle ................................ 338/2 X
3,481,189  12/1969  Brennan et al. ................. 73/768 X

FOREIGN PATENT DOCUMENTS 496712  12/1976  Australia ............................. 73/768

*Primary Examiner*—C. L. Albritton
*Attorney, Agent, or Firm*—Millen & White

[57] ABSTRACT

A data sensor comprises a carrier member consisting of metal and shaped as a hollow section (1) and subdivided into adhering sections (2 and 3) and a measuring section (5). The adhering sections carry annular discs (4) and the measuring section (5) has strain gauges (6 and 7) arranged in mutually diametrically opposing positions. Within the area of the measuring section (5) the strain gauges (6 and 7) connected with the periphery of the carrier member are covered by an insulating mastic (8) with a self-welding tape (9) wound therearound. A shrinking hose (10) is provided as an outermost cover for the measuring section. The ratio of the cross-sectional area ($F_B$) defined by the outer contour of the hollow section (1) and the cross-sectional area ($F_M$) of the material of the hollow section are selected to equal the ratio of the coefficient of elasticity ($E_M$) of the material of the carrier member and the coefficient of elasticity ($E_B$) of the concrete (FIG. 1).

10 Claims, 2 Drawing Figures

DATUM SENSOR FOR MEASURING ELONGATIONS

BACKGROUND OF THE INVENTION

The invention refers to a datum sensor for measuring of elongations in buildings of concrete, comprising a carrier member of metal, particularly steel, and designed as a hollow section and carrying the strain gauges and having its end portions, which are, if desired, profilated, designed as adhering portions. The carrier member has, in its middle portion forming the measuring section, the strain gauges fastened at the outer periphery of the hollow section. It is already known to use tubular deformation bodies as carriers for strain gauges, but such bodies have not been embedded within a building and instead have been arranged at the outer side in an analogous manner as were arranged pressure cells.

In connection with the use of tubular carriers for datum sensors there existed furthermore the prejudice that the buckling strength of the carrier will be reduced. With the known datum sensors proposed for measuring of elongations in concrete, which sensors usually comprise a solid and rod-like carrier, a first difficulty is generally encountered on the basis of not taking into consideration the shrinkage behaviour and the micro cracks resulting from such shrinkage. A further difficulty arises when measuring elongations in concrete buildings results from each datum sensor influencing the strength properties within that area within which the measurement is to be effected and thus, from measuring only correspondingly distorted values. It is already known to apply strain gauges on carriers of plastic material. Such carriers consisting of platstic material are different from the concrete surrounding the measuring area to such a great extent that the measured values are only insufficiently correlated to the actual conditions. When measuring elongations in concrete buildings there must additionally be considered that on account of the grain size of the aggregates of the concrete, relatively long carriers are required for the strain gauges to obtain an integrating measurement of greater reliability. However, it is just with such relatively long carriers that, with the known embodiments, the strength properties are strongly distorted within the area of measurement.

SUMMARY OF THE INVENTION

It is now an object of the invention to design a datum sensor of the type initially mentioned such that measuring can be performed without being influenced by micro cracks, and with consideration of the actual stress of the concrete. The invention further aims at improving manipulation of such a datum sensor. In particular, it will be possible to unobjectionably position the datum sensor without any danger of injury even if later on concrete is poured onto the datum sensor placed in position.

For solving this task, the construction according to the invention is essentially characterized in that the cross sectional area defined by the outer contour of the hollow section and the cross sectional area of the material of the hollow section are selected to equal the ratio between the coefficient of elasticity of the material of the carrier body and the coefficient of elasticity of the concrete. By using a hollow section as the carrier for the datum sensor, there is provided the possibility of considering the circumstance wherein the coefficient of elasticity of the carrier member of the datum sensor is different from the coefficient of elasticity of the concrete surrounding said carrier member. By dimensioning the hollow section according to the present invention, differences in the properties of the material of the carrier member and of the building to be tested or checked are compensated for when effecting a measurement, and in view of this compensation of the different properties of the materials it is now also possible to give the carrier member a corresponding length which allows effecting an integrating measurement without influencing the strength properties, particularly the intrinsic stiffness of the building, by the datum sensor. Such an influence would, without using hollow sections dimensioned according to the invention, not be neglectable in slender buildings, particularly prestressed concrete constructions. By selecting the cross sections as proposed by the invention, the elongation strength (coefficient of elasticity) of the displaced concrete section is, at the area of the datum sensor, substituted by the corresponding elongation strength (coefficient of elasticity) of the carrier member, so that the intrisic stiffness of the building is not influenced whatsoever at the area of measurement. The most suitable material for the hollow section steel is selected to be material which has a coefficient of thermal expansion comparable with that of concrete. For this material, temperature-compensated strain gauges are available.

Strain gauges can be arranged in a conventional manner known in the axial direction and, respectively, or in circumferential direction of the carrier member, and the datum can be determined with high accuracy by means of a bridge circuit. The carrier member is, after having been embedded within the concrete, in positive connection with the building, both with respect to forces and with respect to path of movement, by the end portions designed as adhering portions.

In an advantegeous manner the arrangement is such that the strain gauges are provided with a covering preventing a frictional contact with the concrete within the measuring section. In this manner, load transmission within the measuring section is prevented and the covering protects the measuring area against humidity and load stress.

In view of the consistency of the coefficient of elasticity of the carrier member with the coefficient of elasticity of the displaced concrete section, it is possible to give the measuring section and the anchoring section a sufficiently great length, and to effect a measurement giving an average value. For this purpose and for making measurements in concrete, the length of the measuring section is preferably within the range of 6-times to 12-times, preferably 8-times to 10-times, of the maximum grain size of the concrete aggregate. With this dimensioning, the circumstance is considered that any inhomogeneity influencing the measurement has a decay length of approximately 5-times of the maximum grain size of the aggregate in the concrete. Considering the fact that this length must be considered at both sides of the inhomogeneity, there results a preferred range for the length of the measuring section which length is within the range of 8-times to 10-times the maximum grain size of the concrete aggregates. The average value of the datum thus obtained between the adhering sections does suppress the inhomogeneities specific for concrete, noting that the measured elongations are immediately comparable with the static calculation principles of the carrying capacity process and with Austrian standard B4200 (Ö-Norm B4200). In view of the strain gauges being fastened on the outer periphery of the hollow section, the relatively easy deformability of the hollow section on being loaded in transverse direction to the longitudinal axis of the hollow section can be compensated by filling the hollow section by a casting step, noting that it has only to be considered that the cast filling material need not transmit any load. To prevent bulging, the hollow section of the carrier member can be filled with a mass of lower compressibility than that of the hollow section, particularly with sand or concrete. Transmission of pressure forces in the longitudinal direction can also be interrupted by a porous disc, for example of foamed rubber, provided at the ends of the filling material. Load transmission onto the hollow section can, when filling the hollow section with concrete, be prevented by lubricating the hollow section with grease.

In an advantegeous manner, the inventive datum sensor is designed such that a layer of covering mastic is applied around the strain gauges, with the section covered by the covering mastic being taped with a self-welding sheet or with a self-welding tape under a pressure sufficient for welding, and in that as an outer wall a shrinking hose shrunk by heating is arranged. The covering mastic serves, on the one hand, as an insulation of the measuring section against humidity and, on the other hand, as a mechanical stabilization for the wiring in view of its adhesive properties. By the taping step performed with a self-welding sheet or with a self-welding tape, a further mechanical stabilisation and homogenization of the the kneadable covering mastic is obtained provided that a pressure sufficient for welding is applied. The last layer covering the measuring section is formed of a shrunk-on hose. The shrinking hose to be applied is preferably provided with an asphalt layer at its inner side and is responsible for heating the measuring areas, as has been experienced, to approximately +60° C. when being heated for shrinking. At this temmperature, complete homogenization of the mastic can be observed which simultaneously becomes permanently adhered to the steel surface. The internal asphalt layer of the shrinking hose provides an additional protection against humidity. After having been shrunk, the shrinking hose represents a sleeve of high impact resistance, said sleeve improving, on the one hand, the mechanical protection of the measuring section during the mounting operation and on placing the concrete and preventing, on the other hand, in view of the smooth surface of the shrinking hose, transmission of load onto the strain gauges at the area of the measuring section. Transmission of load shall only be effected at the area of the adhering portions located outside of the measuring section, for which purpose the surface of the tube can be profiled at the end portions of the tube or can be provided by welding, for example, with claws or annular discs.

In the following, the invention is further illustrated with reference to an embodiment shown in the drawing.

DETAILED DISCUSSION OF THE INVENTION

Figure 1:
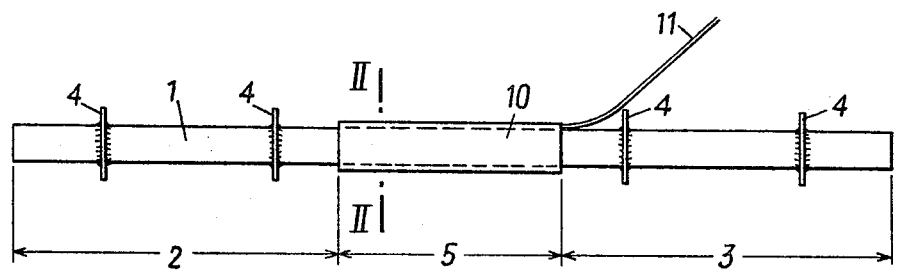
FIG. 1 is a lateral view of the datum sensor according to the invention.

In FIG. 1, the hollow section 1 consisting of a steel tube and forming the carrier member is provided, by welding at the area of the adhering sections 2 and 3, with annular discs 4 for improving adhesion within the concrete. The measuring section 5 has, in consideration of a practically feasible maximum grain size of concrete aggregate, a mean total length of approximately 250 mm, corresponding to approximately 10-times the maximum grain diameter which is approximately 25 mm.

Figure 2:
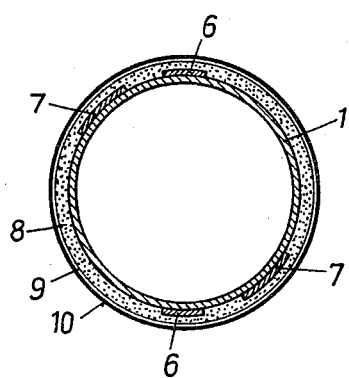
FIG. 2 is a section along line II—II of FIG. 1.

As can be particularly derived from FIG. 2, a steel tube is used having a diameter of approximately 40 mm, and a wall thickness of approximately 1.5 mm. The ratio between the resulting cross sectional area $F_M$ of the carrier member designed in this manner and the cross sectional area ($F_B$) of the concrete displaced is the same as the ratio between the coefficient of elasticity of the concrete and the coefficient of elasticity of the steel. The coefficient of elasticity of steel was assumed to have a value of approximately 21,000 kN/cm$^2$ and the coefficient of elasticity of concrete was assumed to have a value of approximately 3000 kN/cm$^2$. Based on the equation $$F_M \cdot E_M = F_B \cdot E_B$$

there results the required wall thickness for each selected diameter of the tube of the carrier member and with consideration of the coefficient of elasticity valid for the carrier member.

At the area of the measuring section, strain gauges 6 and 7 are, as can be particularly derived from FIG. 2, fastened in mutually diametrically opposing locations. The strain gauges 6 are arranged in the axial direction of the tube. The strain gauges 7 have their measuring direction extending in the circumferential direction, i.e. arranged at an angle of 90° relative to the tube axis. With this arrangement, there results in the case of a steel tube and of a full bridge circuit, an improved measuring effect, all four strain gauges being connected as active sensors. The full bridge circuit has the advantage of being insensible against the length of the supply cable leading to the measuring area and of being insensible against the influences of the temperature-dependency of the supply cable. Also, the contact resistance is without importance when effecting the measurement. By arranging two pressure gauges in circumferential direction, the dilatation and, respectively, the contraction in the transverse direction corresponding to a compression or to an elongation is measured, and by considering these measured values in the bridge circuit the sensibility can substantially be increased. By considering the Poisson's ratio for steel of $\mu_{steel}=0.30$, there results, when using a carrier member of steel, the 2.6-fold measuring effect in a full bridge circuit. This results in a higher resolution of the occurring elongations and thus, also in more exact measured values.

An insulating mastic 8 is applied onto the strain gauges and protects the strain gauges against humidity and mechanically stabalizes the circuitry. A self-welding tape 9 is wound around this mastic, said tape homogenizing the mastic to a great extent. A shrunk-on hose 10 is provided as the outer covering of the measuring section. This shrunk-on hose 10 is provided with an asphalt layer on its inner side and has been heated for shrinking purposes. Heating of the shrinking hose results in heating the measuring area and results in further homogenizing of the mastic.

The adhering sections have a sufficiently great length for the purpose of reliable anchoring within the concrete. As a rule, the length of the adhering sections is at least equal to the length of the measuring sections, preferably greater than the length of the measuring section. In FIG. 1 the supply cable leading to the strain gauges is designated 11. The length of the datum sensor is approximately 1 m.

What is claimed is:

1. A datum sensor for measuring elongations in concrete buildings, adapted for location within a concrete section to be measured and comprising:

a hollow metal carrier member having first and second end portions, adapted for adhering the sensor to concrete, and a middle portion comprising a measuring section and adapted for being located in the concrete section to be measured;

a plurality of strain gauges fastened along the outer periphery of said middle portion of said hollow metal carrier member; and the hollow carrier member is constructed such that when said sensor is located within a concrete section to be measured the ratio of the cross-sectional area ($F_B$) of said measuring section defined by the outer surface of said carrier member to the cross-sectional area ($F_M$) of the hollow section of the carrier member is equal to the ratio of the coefficient of elasticity ($E_M$) of the metal of said carrier member to the coefficient of elasticity ($E_B$) of the concrete to be measured.

2. A datum sensor as in claim 1, wherein said strain gauges (6,7) have a cover for preventing frictional contact with the concrete at said measuring section (5).

3. A datum sensor as in claim 1 or 2, wherein the length of said measuring section (5) is within the range of 6 to 12 times the maximum grain size of the concrete aggregate.

4. A datum sensor as in claim 3, wherein the length of said measuring section (5) is within the range of 8 to 10 times the maximum grain size of the concrete aggregate.

5. A datum sensor as in claim 1 or 2, wherein said carrier member is filled with a mass of material throughout the length thereof, the material in said first and second end portions being more easily compressible than the material in said middle portion, and said material being incapable of transmitting loads in the longitudinal direction of said hollow metal carrier.

6. A datum sensor as in claim 3, wherein said carrier member is filled with a mass of material throughout the length thereof, the material in said first and second end portions being more easily compressible than the material in said middle portion, and said material being incapable of transmitting loads in the longitudinal direction of said hollow metal carrier.

7. A datum sensor as in claim 5, wherein said material in said first and second end portions is polyurethane foam, and said material in said middle portion is sand or concrete.

8. A datum sensor as in claim 6, wherein said material in said first and second end portions is polyurethane foam, and said material in said middle portion is at least one of sand or concrete.

9. A datum sensor as in claim 1 or 2 further comprising a covering mastic (8) applied around said strain gauges (6, 7), a self-welding sheet or tape (9) taped around said covering mastic (8) under sufficient pressure for welding, and a shrinking hose (10) arranged as the outer wall of said sensor and heat shrunk onto said sheet or tape.

10. A datum sensor according to claim 1 or 2, wherein said first and second end portions of said carrier member are profiled at the outer surface for enhancing adhering within the concrete section to be measured.

* * * * *